No. 606,980. Patented July 5, 1898.
P. POINCY.
ART OF RAISING LEVELS OF LOW LANDS.
(Application filed Dec. 29, 1897.)
(No Model.)

Witnesses:

Inventor
Paul Poincy
By James J. Sheehy
Attorney

THE NORRIS PETERS CO., PHOTO-LITHO., WASHINGTON, D. C.

UNITED STATES PATENT OFFICE.

PAUL POINCY, OF NEW ORLEANS, LOUISIANA.

ART OF RAISING LEVELS OF LOW LANDS.

SPECIFICATION forming part of Letters Patent No. 606,980, dated July 5, 1898.

Application filed December 29, 1897. Serial No. 664,228. (No model.)

*To all whom it may concern:*

Be it known that I, PAUL POINCY, a citizen of the United States, residing at New Orleans, in the parish of Orleans and State of Louisiana, have invented certain new and useful Improvements in the Art of Raising the Level of Low Lands; and I do declare the following to be a full, clear, and exact description of the invention, such as will enable others skilled in the art to which it appertains to make and use the same.

My invention relates to means for raising the level of low lands, and it contemplates raising the level of a body of low land by surrounding such body of land with a combined filter and barrier and conveying water containing a large quantity of sediment in suspension into the inclosure thus formed, the said filter and barrier when this is done being adapted in virtue of its great length to retain the water on the land to be raised until it deposits most of its sediment and yet permit such water to escape almost as quickly as it is brought into the inclosure, and thus avoid a too rapid rise of the water and the pressure on the filter and barrier which would be incident thereto.

The invention will be fully understood from the following description and claims when taken in conjunction with the annexed drawings, in which—

Figure 1:
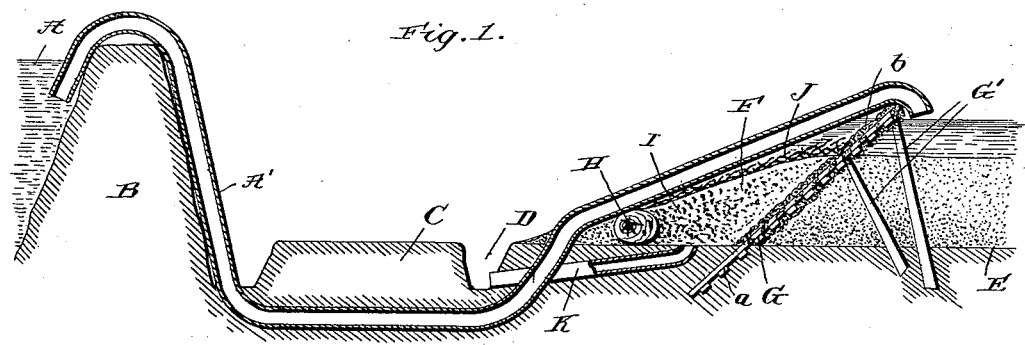
Figure 2:
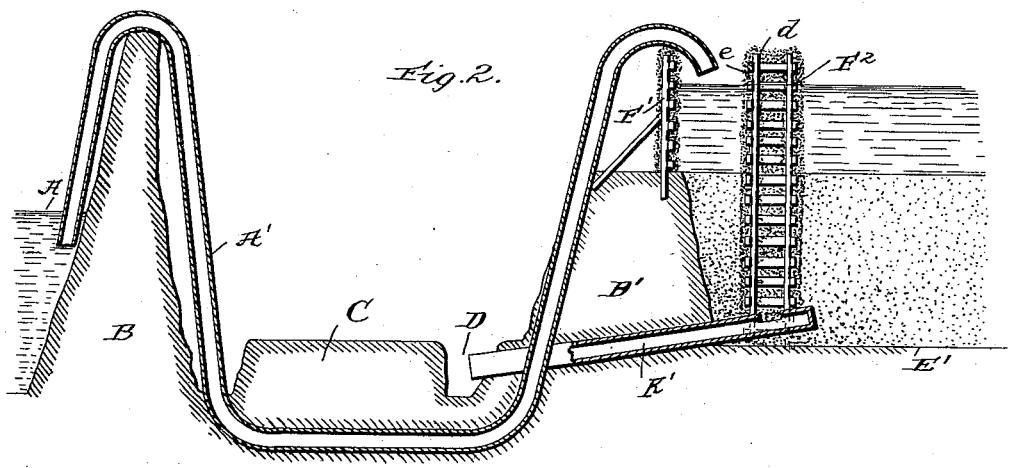
Figure 3:
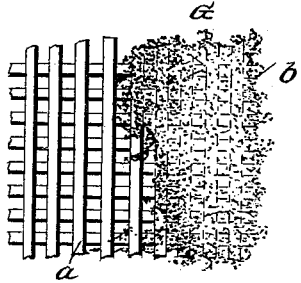
Figure 5:
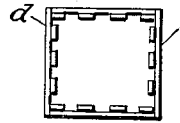
Figure 6:
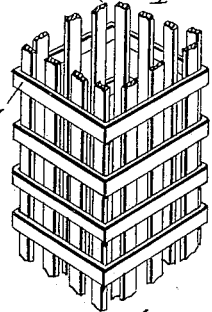
Figure 4:
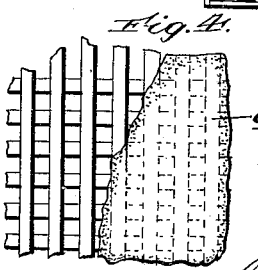

Figures 1 and 2 are sectional views illustrating two modes of carrying out my invention. Fig. 3 is a detail view of a suitable filter which is preferably employed in both embodiments of the invention. Fig. 4 is a detail view of a modification of said filter. Fig. 5 is a detail plan view of the frame of another filter which may be employed in either construction, but is preferably employed in the embodiment of the invention shown in Fig. 2 as an auxiliary filter; and Fig. 6 is a detail perspective view of the same.

Referring by letter to the said drawings, and more particularly to Fig. 1 thereof, A designates a river or other body of water bordered by a levee B.

C designates a roadway at the land side of the levee and which, if desired, may extend entirely around the body of land the level of which is to be raised.

D designates a ditch at the inner side of the roadway, which ditch extends entirely around the body of land to be raised and has an outlet (not shown) at a suitable point.

E designates the body of land the level of which is to be raised.

F designates my improved filter and barrier, which extends entirely around the body of land to be raised, and A' designates a siphon which has for its purpose to convey water from the river or body of water A to the inclosure formed by the filter or barrier.

My invention is designed more especially to raise the level of low lands contiguous to rivers and other bodies of water which are thick with sediment, and I desire to lay stress on the fact that the combined filter and barrier F may be of any construction that is calculated to retain the water until it deposits its sediment and becomes clarified and then permit it to quickly escape, it being only necessary that the filtering capacity be always above the surface of the sediment deposited. I prefer, however, when the water is siphoned from the river to the land to be raised to employ a combined filter and barrier such as shown in Fig. 1. This filter and barrier comprises an inner filter or filter proper, G, inclined inwardly at an angle of about forty-five degrees and sunk in the ground about two inches for every foot of its height above the ground and supported by props G', an outer border H, preferably formed of trunks of trees arranged end to end, a lower strata I of moss or other suitable fibrous material interposed between the border H and filter G and gradually increased in height as it approaches the latter, and a covering J of tree-branches arranged on the strata of fibrous material. The filter or filter proper, G, is sunk in the ground, as stated, when the ground is dry, but when the ground is soft, like that of a swamp, the filter or filter proper will be simply placed upon the ground.

The object of the construction described is to retain by means of the moss the sediment that escapes through the inner filter or filter proper, thus forming with the moss a solid mass which will fully counterbalance all the lateral pressure of the water against said inner filter. The filter G (see Fig. 3) comprises a lattice-work frame $a$, which is preferably of wood, and a filling $b$ of moss or other fibrous material, which is woven on the framework, so as to entirely occupy and closely fill the interstices thereof. Said filter may be provided on one side with a covering c of rough canvas, as shown in Fig. 4, and the moss omitted.

It will be appreciated from the foregoing that my improved filter and barrier may be readily constructed and that, with the exception of the canvas c, all the materials of which it is composed may be readily obtained in the localities where the filter and barrier will be used.

For the purpose of facilitating the passage of the clarified water from the base of the barrier and filter to the ditch D pipes K are arranged at suitable intervals in the length of the filter and barrier, with their outer ends opening into the ditch, as shown.

In Fig. 2 of the drawings I have shown a body of land E', the level of which is to be raised, as surrounded by a levee B' and also surrounded by the filter F', with as many of the filters F² as the area of the land may require placed at suitable distances apart. The filter F' is sunk into and rises from levee B', is supported by props on the outside, and is exactly of the same construction as the filter or filter proper, G, comprised in the filter and barrier F of Fig. 1, while the auxiliary filter or filters F² are solidly attached on the top of an opening in the box-gutter K', which box empties in ditch D. This filter F² is made of exactly the same materials as the filter G of Fig. 1; but instead of having one flat surface it is composed of four of these flat filter sides d, connected to each other at right angles and forming an elongated rectangular hollow filter discharging the water filtered through its four sides into the box-gutter K', so that it may run out rapidly into the ditch D. The purpose of these auxiliary filters F² is to rapidly carry off the clarified water until the sediment reaches the foot of the filter F', which surrounds the body of land, when said filter F' will begin to act more rapidly.

The construction disclosed in Fig. 2 is designed more especially for use upon such lands as are surrounded by small private levees to protect the land from overflow by water coming from breaks in the river-levee at some more or less distant point. On this land the water is discharged by the siphon A', similar to that shown in Fig. 1. When the level of the river is lower than the land, a steam-pump may be used in lieu of the siphon.

It will be appreciated from the foregoing that my combined filters and barriers, on account of their great length as compared to the size of siphon introducing the muddy water on the land, will rapidly discharge the filtered water, so as to avoid too great a lateral pressure, and retaining inside the greater portion of the sediment will very quickly raise the level of low lands to any desired height.

Having thus described my invention, what I claim is—

1. A filter comprising an open framework of wood or other material, and a filling b of moss or other fibrous material woven on the framework and occupying and closely filling the interstices thereof, substantially as specified.

2. The means described for raising the level of low lands consisting of a combined filter and barrier surrounding the body of land, the level of which is to be raised, and extending above the land a sufficient distance to present a filtering-surface above the sediment deposited, a ditch surrounding the filter and barrier, pipes interposed between the base of the combined filter and barrier and the ditch at suitable intervals, and suitable means for conveying water from a source of supply into the inclosure formed by the filter and barrier, substantially as specified.

3. The means described for raising the level of low lands consisting of a combined filter and barrier surrounding the body of land, the level of which is to be raised, and extending above the same a sufficient distance to always present a filtering-surface above the sediment deposited, a ditch surrounding the combined filter and barrier, an auxiliary, hollow filter arranged within the inclosure formed by the combined filter and barrier, a trough or pipe interposed between the bottom of the auxiliary filter and said ditch, and suitable means for conveying water from a source of supply into the inclosure formed by the filter and barrier, substantially as specified.

In testimony whereof I affix my signature in presence of two witnesses.

PAUL POINCY.

Witnesses:
HENRY CHIAPELLA,
RAOUL JOSEPH SEGHERS.